US008139449B2

(12) United States Patent  (10) Patent No.: US 8,139,449 B2
Kim                       (45) Date of Patent:    Mar. 20, 2012

(54) METHOD AND APPARATUS FOR ELIMINATING ERRORS IN A SEEK OPERATION ON A RECORDING MEDIUM

(75) Inventor: Tae Soo Kim, Pyungtaek-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 1255 days.

(21) Appl. No.: 11/131,227

(22) Filed: May 18, 2005

(65) Prior Publication Data

US 2006/0041796 A1    Feb. 23, 2006

(30) Foreign Application Priority Data

Aug. 18, 2004 (KR) .................. 10-2004-0065011

(51) Int. Cl.
 *G11B 21/08* (2006.01)
(52) U.S. Cl. .................. 369/30.11; 369/44.28
(58) Field of Classification Search .......... 369/30.1, 369/30.11, 30.12, 30.13, 30.14, 30.15, 30.16, 369/30.17, 44.28, 44.29, 44.35; 360/78.01, 360/78.02, 78.03, 78.04, 78.05, 78.06, 78.07, 360/78.08, 78.09, 78.11, 78.12, 78.13, 78.14
See application file for complete search history.

(56) References Cited

U.S. PATENT DOCUMENTS

| | | | | |
|---|---|---|---|---|
| 4,972,350 A * | 11/1990 | Sander et al. | ............. | 369/44.28 |
| 5,036,508 A * | 7/1991 | Okano | .................. | 369/47.48 |
| 5,642,342 A * | 6/1997 | Murata | .................. | 369/47.41 |
| 5,870,356 A * | 2/1999 | Ikeda | .................. | 369/30.15 |
| 5,982,724 A * | 11/1999 | Hayashi et al. | ............. | 369/47.3 |
| 6,009,056 A * | 12/1999 | Araki et al. | ................ | 369/47.4 |
| 6,118,742 A * | 9/2000 | Matsui et al. | ............. | 369/47.48 |
| 6,157,603 A * | 12/2000 | Okubo et al. | ................ | 369/53.1 |
| 6,236,632 B1 * | 5/2001 | Hayashi | .................. | 369/59.16 |
| 6,438,080 B1 * | 8/2002 | Shoji et al. | ................ | 369/47.28 |
| 6,687,194 B1 * | 2/2004 | Kobayashi et al. | ........ | 369/13.05 |
| 6,792,063 B1 * | 9/2004 | Ogura | .................. | 375/375 |
| 2001/0010673 A1 * | 8/2001 | Chan | .................. | 369/53.28 |
| 2002/0136114 A1 * | 9/2002 | Kadlec et al. | ............. | 369/44.29 |
| 2003/0026178 A1 * | 2/2003 | Hirashima | ................ | 369/44.29 |
| 2003/0169651 A1 * | 9/2003 | Kobayashi | ................ | 369/44.28 |
| 2003/0169654 A1 * | 9/2003 | Hino et al. | ................ | 369/44.34 |
| 2004/0013062 A1 * | 1/2004 | Hino et al. | ................ | 369/47.14 |
| 2004/0240348 A1 * | 12/2004 | Mitsuda | .................. | 369/47.28 |

FOREIGN PATENT DOCUMENTS

JP   2000-163890    * 6/2000
KR   1020010011117    2/2001

* cited by examiner

*Primary Examiner* — Tan X Dinh
(74) *Attorney, Agent, or Firm* — Ked & Associates, LLP

(57) ABSTRACT

A method and apparatus for eliminating errors in a seek operation on a recording medium are provided. Given a target address on a recording medium, a reading device is moved to seek the target address, and it is determined whether or not a signal is read out at the location to which the reading device has been moved. If the expected signal is not available at that location, by extending a variable frequency range of an oscillator clock of a PLL circuit or by increasing a track gap between the target address and the track to which the reading device jumps initially to seek the target address, the oscillator clock can be phase-synchronized to EFM signal from the recording medium reliably, resulting in reduction of the seek errors.

22 Claims, 6 Drawing Sheets

METHOD AND APPARATUS FOR ELIMINATING ERRORS IN A SEEK OPERATION ON A RECORDING MEDIUM

BACKGROUND OF THE INVENTION

1. Field of the Invention

The invention relates to method and apparatus for eliminating errors in a seek operation on a recording medium.

2. Background of the Related Art

In a disk apparatus, such as a disk drive, an optical pickup is moved to a target address on an optical disk loaded therein to read out data from the target address. This is called a seek operation. FIG. 1 shows a flow chart of a related art seek operation.

Specifically, given a target address, the present address of the optical pickup is obtained, in step S0, and the number of tracks to move or jump is calculated, in step S1. In step S1, the number of tracks to move is calculated based on a difference between the present track and the first inner track of a target track containing the target address (hereinafter, referred to as the "pre-target track"). If the number of tracks to move is zero, in step S2, it is determined that the optical pickup has reached the pre-target track. Otherwise, the seek operation continues so that the optical pickup is moved by the re-calculated number of tracks and then address information, such as sub-Q, is read out again at that address on the optical disk, in step S3.

If the target address has not been sought for a predetermined period of time, a seek retry counter, 'SEEKRetryCnt' is increased by 1, in step S4. And then, if 'SEEKRetryCnt' is smaller than a predetermined seek retry number of times, 'SEEK_RETRY_LIMIT', in step S5, steps S0 and S1 are repeated; otherwise, it is determined that a seek error occurs, in step S6. The seek operation error may be caused by a servo-control error or a delay of phase-locking of a phase-locked loop (PLL) circuit by which a clock of a PLL circuit is phase-synchronized to a signal read out from the optical disk. The latter case is described below in detail with reference to FIG. 2.

Given a target address CT, on the track #21 in FIG. 2), the optical pickup is moved to the pre-target track (track #22 in FIG. 2). A laser beam of the optical pickup is positioned on the pre-target track and then reaches near the target address by performing a tracking operation along the spiral track. During the tracking operation, eight-to-fourteen modulation (EFM) signals are read out from those tracks. By phase-locking a clock of the PLL circuit to the EFM signal, sub-Q data can be read out and used to determine whether or not the target address is sought.

Phase synchronization between the clock of the PLL circuit and the EFM signal may fail during the pickup transition from the pre-target track to the target address (T1 in FIG. 2), which is caused mainly by a large phase difference between them. If this occurs, and thus if the phase synchronization is completed on other tracks passing the target address (for example, track #23), the same operations as before are executed once so as to seek the target address by moving the optical pickup to the pre-target track and performing the phase synchronization of the PLL clock.

If phase synchronization between the clock of the PLL circuit and the EFM signal fails again during the pickup transition to the target address, the same seek operations including the optical pickup movement and the PLL clock phase-locking are repeated until the target address is sought. A seek error occurs if the seek operation is not made for a predetermined number of times or a predetermined period of time.

SUMMARY OF THE INVENTION

An object of the invention is to solve at least the above problems and/or disadvantages and to provide at least the advantages described hereinafter.

In order to achieve at least the above objects, in whole or in part, and in accordance with the purposes of the invention, as embodied and broadly described herein, there is provided a method of eliminating errors in a seek operation on a recording medium in accordance with an embodiment of the invention that includes moving a reading device to a target location on a recording medium, checking whether or not a signal is read out at the target location to which the reading device has been moved, and extending a variable frequency range of a synchronization clock of a PLL circuit based on the checking result, the synchronization clock being phase-synchronized to an output signal of the reading device.

To further achieve at least the above objects, in whole or in part, and in accordance with the purposes of the invention, as embodied and broadly described herein, there is provided an apparatus for reading, reproducing, or recording a recording medium in accordance with an embodiment of the invention that includes a servo-controller configured to move a reading device to a target location on a recording medium, a signal processor configured to check whether or not a signal is read out at the target location to which the reading device has been moved, and a controller configured to extend a variable frequency range of a synchronization clock of a PLL circuit based on the checking result, the synchronization clock being phase-synchronized to an output signal of the reading device.

To further achieve at least the above objects, in whole or in part, and in accordance with the purposes of the invention, as embodied and broadly described herein, there is provided a method of eliminating errors in a seek operation on a recording medium in accordance with an embodiment of the invention that includes moving a reading device a predetermined first track gap to a target track, checking whether or not a signal is read out at the target track to which the reading device has been moved, and moving the reading device to another inner track of the target track based on the checking result, the another inner track being located on an inside of the target track by a second predetermined track gap that is larger than the first predetermined track gap.

To further achieve at least the above objects, in whole or in part, and in accordance with the purposes of the invention, as embodied and broadly described herein, there is provided an apparatus for reading, reproducing, or recording a recording medium in accordance with an embodiment of the invention that includes a servo-controller configured to move a reading device a predetermined first track gap to a target track, a signal processor configured to check whether or not a signal is read out at the target track to which the reading device has been moved, and a controller configured to move the reading device to another inner track of the target track based on the checking result, the another inner track being located on an inside of the target track by a second predetermined track gap that is larger than the first predetermined track gap.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
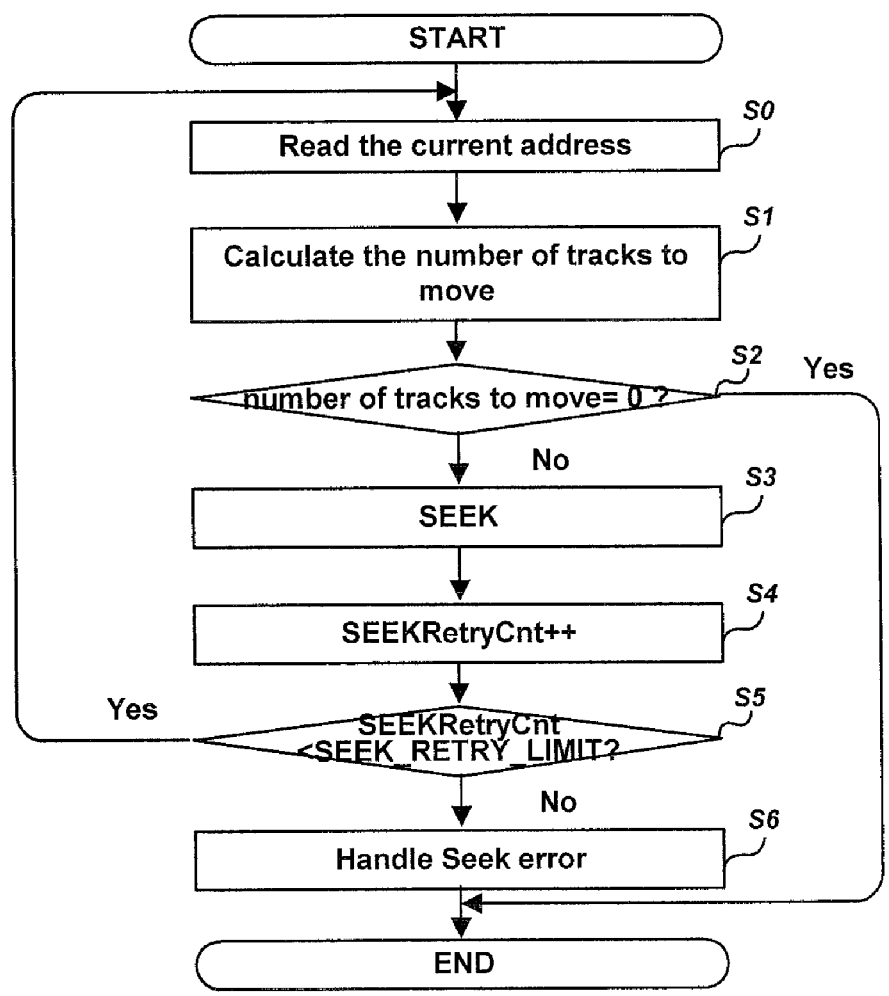
FIG. 1 is a flow chart of a related art seek operation.
Figure 2:
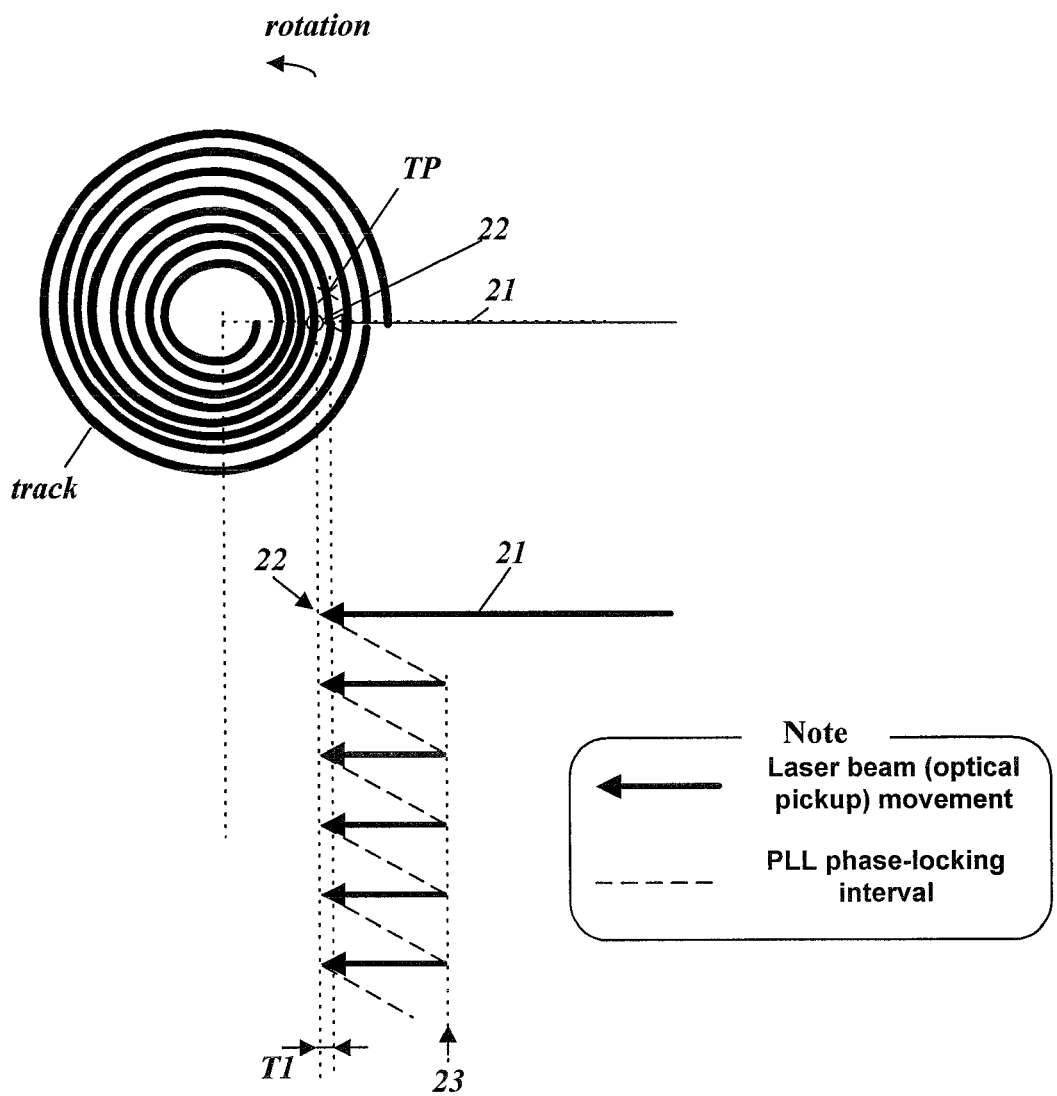
FIG. 2 illustrates a seek error that occurs due to delay of phase-locking in a PLL circuit in the seek operation of FIG. 1.

Now, a method and apparatus for eliminating errors in a seek operation on a recording medium in accordance with embodiments of the invention will be described in detail with reference to the drawings, in which like reference numerals have been used to designate like elements. The invention is shown implemented in an optical disk drive. However, it may also be implemented in other apparatus for reading, reproducing, or recording a recording medium.

Figure 3:
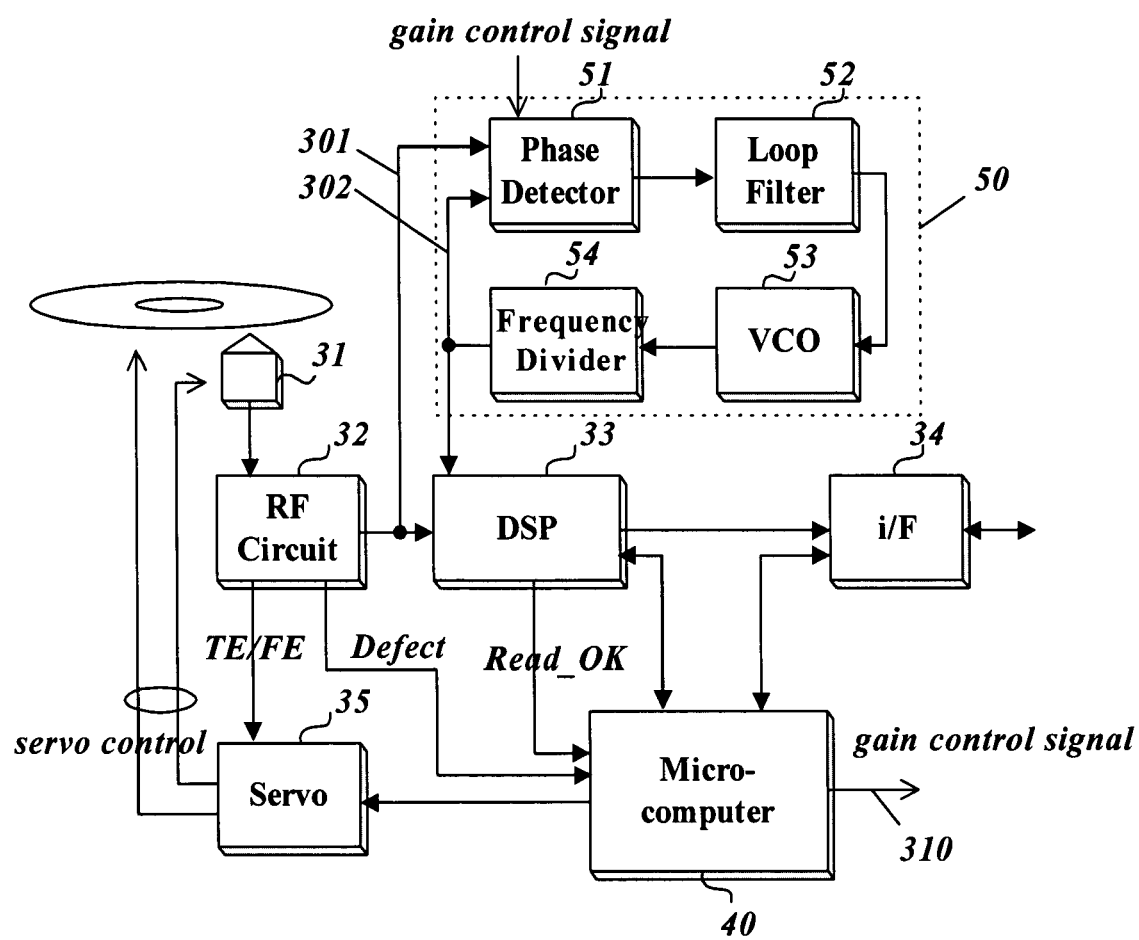
FIG. 3 is a partial block diagram of a disk drive in accordance with an embodiment of the invention.

FIG. 3 is a partial block diagram of a disk drive according to an embodiment of the invention. The disk drive comprises an optical pickup 31 for reading out signals from an optical disc loaded therein, an RF circuit 32 for producing an EFM signal from a signal that is read out by the optical pickup and producing both a tracking error (TE) signal and a focusing error (FE) signal, a PLL circuit 50 for producing a synchronization clock that is phase-locked to the EFM signal, a DSP 33 for demodulating the EFM signal into digital data by using the synchronization clock; an interface 34 for communicating with an external device such as personal computer (PC), a servo 35 for servo-controlling the objective lens attached to the optical pickup, disk rotation, and movement of the optical pickup; and a microcomputer 40 for processing the reproduction and seek operation.

The PLL circuit 50 comprises a phase detector (PD) 51 that detects a phase difference between the EFM signal and a voltage-controlled oscillator (VCO) clock and produces a signal in proportion to the phase difference, a loop filter 52 for producing a low-pass component of the phase difference-proportionate signal; a VCO 53 for generating and producing a clock whose frequency is proportional to the input voltage, and a frequency divider 54 for frequency-dividing the VCO clock. The microcomputer 40 adjusts a gain of the phase detector 51 by using a gain control signal, as needed, so that the range of the phase difference that can be locked by the PLL circuit is extended.

Figure 4:
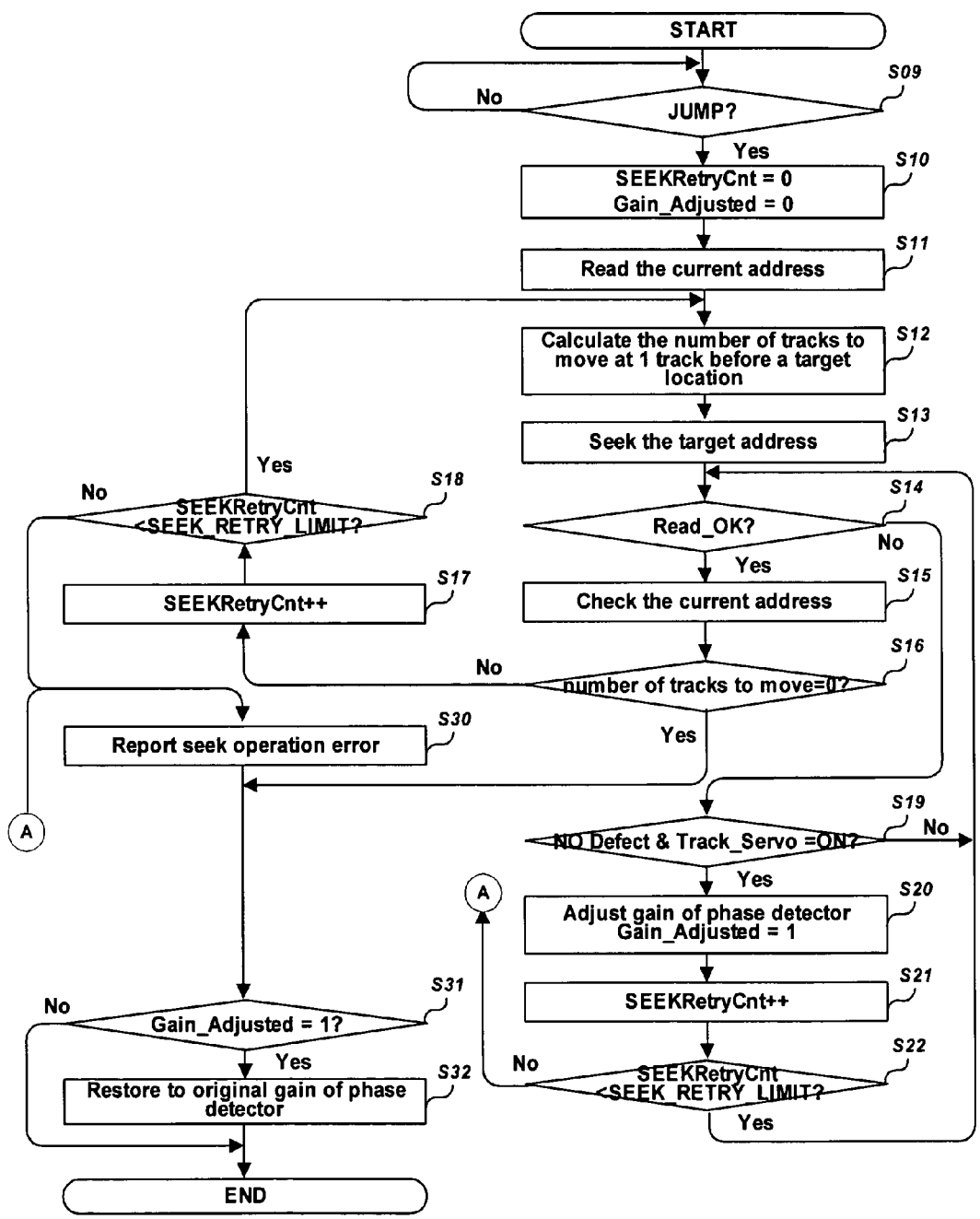
FIG. 4 is a flowchart of a seek error elimination method according to an embodiment of the invention.

FIG. 4 is a flowchart of a seek error elimination method according to an embodiment of the invention and will be described below in detail with reference to the partial block diagram of the disk drive shown in FIG. 3. The flowchart and corresponding method of FIG. 4 is applicable to other disk-related apparatus other than the disk drive shown in FIG. 3, such as DVD players and audio CD players.

Given a jump command via the interface 34, in step S09, the microcomputer 40 initializes seek operation-related variables, such as 'SEEKRetryCnt' and 'Gain_Adjusted' (these variables will be described later in detail) to zeros, in step S10, and then detects the current address on an optical disk by reading out MM:SS:FF values contained in sub-Q frame data, in step S11. Then, the microcomputer 40 calculates the number of tracks to move based on the current address and the target address that has been specified by the jump command, in step S12. The number of tracks to move is calculated based on a difference between the current track and the first inner track of the target track containing the target address.

Based on the number of tracks to move calculated in step S12, the optical pickup 31 is moved by the servo 35, in step S13. If the number of tracks to move is smaller than a predetermined number of tracks, the objective lens is controlled so that the laser beam of the optical pickup 31 reaches the target track.

After the pickup transition, the microcomputer 40 determines if a 'Read_OK' signal is input from the DSP 33, in step S14. The 'Read_OK' signal is a signal that is produced when a VCO clock in the PLL circuit 50 is phase-synchronized to the EFM signal produced by the RF circuit 32. Specifically, the 'Read_OK' signal is produced only when a frame synchronization signal has been detected from the EFM signal consecutively a predetermined number of times, which implies that the EFM signal are demodulated to a bit train successfully by using the phase-locked synchronization clock.

Receiving the 'Read_OK' signal, the microcomputer 40 determines the current address based on data frame interpreted by the DSP 33, in step S15, and then examines whether or not the current address is the target address, in step S16. If another pickup transition is required to seek the target address, 'SEEKRetryCnt' is increased by 1 signifying the number of seek retrials up to now, in step S17, and it is then determined whether or not 'SEEKRetryCnt' is larger than a predetermined maximum number of times, or 'SEEK_RETRY_LIMIT', in step S18. If it is smaller than 'SEEK_RETRY_LIMIT', the microcomputer 40 calculates the number of tracks to move again, as in step S12, and then performs the subsequent steps S13 through S14 according to the conditions.

If a 'Read_OK' signal is not generated in step S13, the microcomputer 40 examines if a defect signal is produced from the RF circuit 32 and at the same time, examines if the current state is a tracking ON state, in step S19. The defect signal is a signal that is produced from the RF circuit 32 when RF signals are not detected for a predetermined period of time due to disk surface defects, such as fingerprints or scratches thereon.

Figure 5:
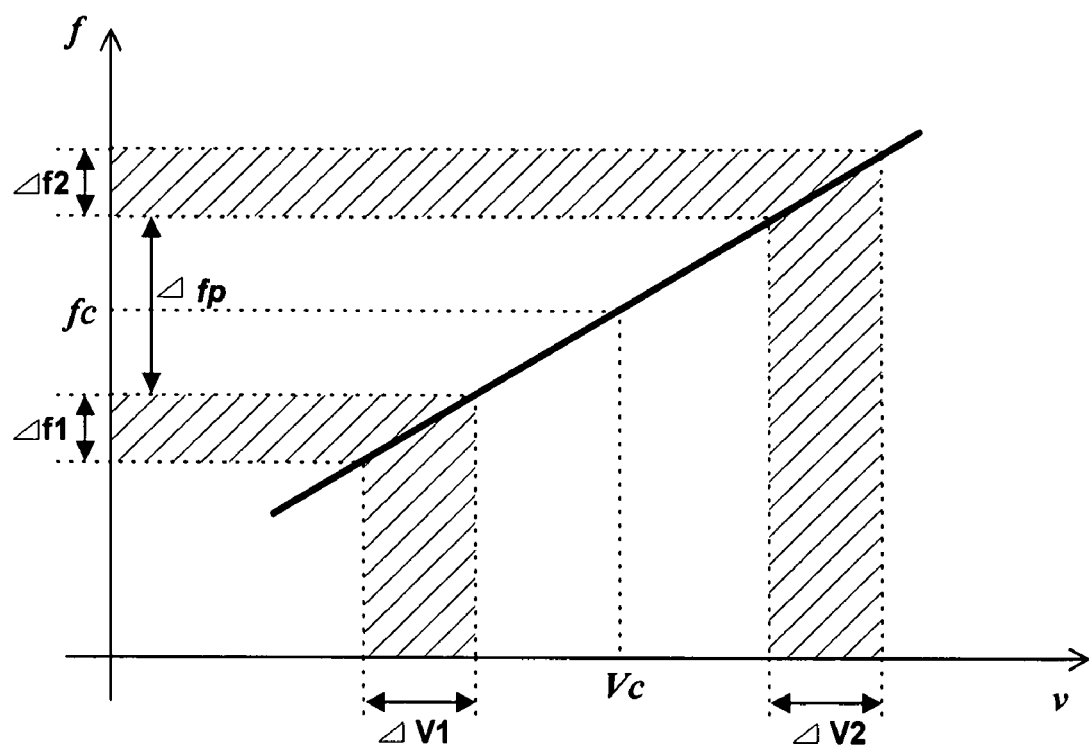
FIG. 5 illustrates a relation between the frequency of output clock and input voltage in a voltage-controlled oscillator.

If there is no defect signal in the tracking ON state, the microcomputer 40 determines that the reason why a 'Read_OK' signal is not generated is that the VCO clock signal has not been phase synchronized to the EFM signal read out from the disk, and thus increases the gain of the phase detector 51 in the PLL circuit 50, in step S20. Since a large value of the gain increases the degree to which an output voltage is proportional to the phase difference, a range of voltage that is applied to the VCO 53 via the loop filter 52 is increased by '$\Delta V1+\Delta V2$', as shown in FIG. 5. As a result, a frequency range of the VCO clock is, in turn, extended by '$\Delta f1+\Delta f2$', as shown in FIG. 5. Hence, the EFM signal and the VCO clock signal that would be impossible or take considerable amount of time for phase synchronization therebetween with a frequency range $\Delta fp$ can be phase-synchronized to each other in a shorter period of time.

Once the gain is adjusted, a 'Gain_Adjusted' variable is set to 1 so as to indicate that the gain has been varied. Then, 'SEEKRetryCnt' is increased by 1, in step S21, and it is examined whether or not 'SEEKRetryCnt' is smaller than 'SEEK_RETRY_LIMIT', in step S22. If the condition is met, the microcomputer 40 goes back to step S14 to wait for 'Read_OK' signal. If 'SEEKRetryCnt' becomes equal to 'SEEK_RETRY_LIMIT', the microcomputer 40 informs the external device through the interface 34 that a seek error has occurred, in step S30. Then, the microcomputer 40 examines the value of 'Gain_Adjusted', in step S31, and if 'Gain_Adjusted' is equal to 1, the gain of the phase detector 51 is reset to the initial value, in step S32. By doing this, the VCO clock frequency is prevented from being varied sensitively due to high gain of the phase detector 51, even to noise of the EFM signals that often occur in the normal condition.

On the other hand, if it is determined that the number of tracks to move is zero, in step S16, in a normal or high value of the gain, the microcomputer 40 examines the value of 'Gain_Adjusted', in step S31, and if 'Gain_Adjusted' is equal to 1, the gain of the phase detector 51 is reset to the initial value, in step S32.

Figure 6:
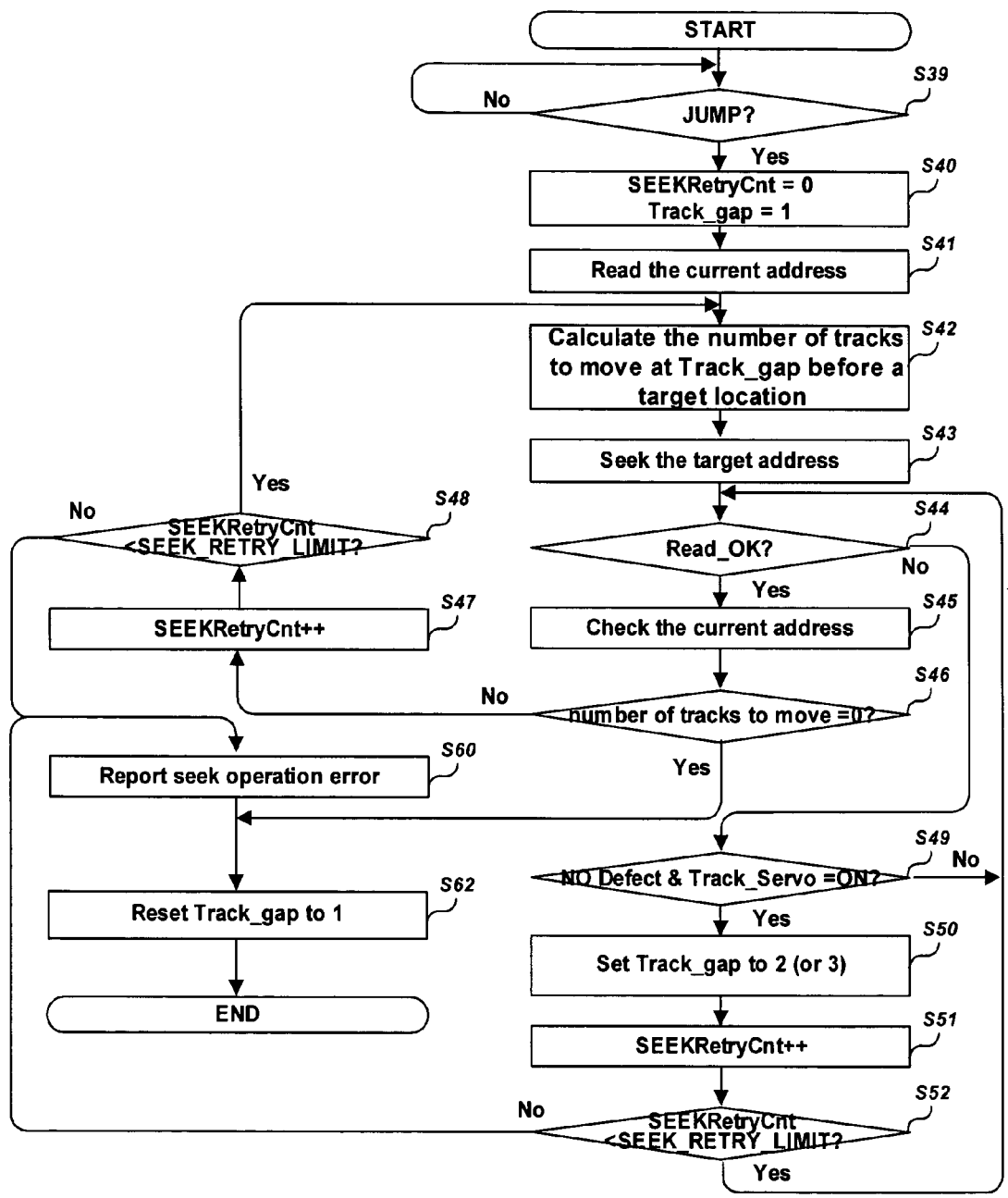
FIG. 6 is a flowchart of a seek error elimination method according to another embodiment of the invention.

A seek error elimination method according to another embodiment of the invention will be described below in detail with reference to FIG. 6. FIG. 6 is a flowchart of another embodiment of the invention that is applicable to the disk drive of FIG. 3. In this embodiment, the microcomputer 40 does not use the gain control signal to eliminate the seek errors.

Given a jump command via the interface 34, in step S39, the microcomputer 40 initializes 'SEEKRetryCnt' to 0 and 'Track_gap' to 1, in step S40, and then detects the current address on an optical disk by reading out MM:SS:FF values contained in sub-Q frame data, in step S41. Next, the microcomputer 40 calculates the number of tracks to move based on the current address and the target address that has been specified by the jump command, in step S42. The number of tracks to move is calculated based on a difference between the current track and one inner track that is located on the inside of the target track by the value of 'Track_gap'. By setting 'Track_gap' to 1, the number of tracks to move is calculated initially on the basis of the first inner track of the target track.

Based on the number of tracks calculated in step S42, the optical pickup 31 is moved by the servo 35, in step S43. If the number of tracks to move is smaller than a predetermined number of tracks, the objective lens is controlled so that the laser beam of the optical pickup 31 reaches the target track. After the pickup transition, the microcomputer 40 determines if a 'Read_OK' signal is input from the DSP 33, in step S44.

Receiving the 'Read_OK' signal, the microcomputer 40 determines the current address based on data frame interpreted by the DSP 33, in step S45, and then examines whether or not the current address is the target address, in step S46. If another pickup transition is required to seek the target address, 'SEEKRetryCnt' is increased by 1, signifying the number of seek retrials up to now, in step S47, and it is then determined whether or not 'SEEKRetryCnt' is larger than a predetermined maximum number of times, or 'SEEK_RETRY_LIMIT', in step S48. If it is smaller than 'SEEK_RETRY_LIMIT', the microcomputer 40 calculates the number of tracks to move again, as in step S42 and then performs the subsequent steps S43 through S44 according to the conditions.

If a 'Read_OK' signal is not generated after step S43, the microcomputer 40 examines if a defect signal is produced from the RF circuit 32 and at the same time, examines if the current state is a tracking ON state, in step S49. If the defect signal is not produced in the tracking ON state, the microcomputer 40 determines that the reason why a 'Read_OK' signal is not generated is that the VCO clock signal has not been phase synchronized to the EFM signal read out from the disk, and thus sets 'Track_gap' to 2 or 3, in step S50, so that the number of tracks to move will be calculated based on a more inside track, in step S42, in the subsequent seek retry. By doing this, it takes two or three times the amount of time taken for the optical pickup to reach the target address than that of 'Track_gap' =1. Hence, the EFM signal and the VCO clock signal that would be otherwise impossible or require considerable amount of time for phase synchronization can be phase-synchronized to each other during the extended pickup transition time.

After step S50, 'SEEKRetryCnt' is increased by 1, in step S51, and then it is examined whether or not 'SEEKRetryCnt' is smaller than 'SEEK_RETRY_LIMIT', in step S52. If it is equal to 'SEEK_RETRY_LIMIT', the microcomputer 40 informs an external device through the interface 34 that a seek operation error has occurred, in step S60. Regardless of whether a seek operation error occurs or the target address is sought successfully, 'Track_gap' is reset to 1, which enables rapid phase synchronization for the pickup transition between tracks whose phase difference is relatively small by alleviating an unnecessary long transition by a large value of 'Track_gap'.

The method and apparatus according to embodiments of the invention provide at least the following advantages.

The method and apparatus according to embodiments of the invention eliminate errors in the seek operation on a recording medium due to the time delay in phase synchronization of a PLL circuit. The method and apparatus according to embodiments of the invention further provide an effective way of eliminating errors in seek operations caused by the time delay of a PLL circuit phase-locking that occurs because the PLL circuit has been tuned initially inappropriately.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of eliminating errors in a seek operation on a recording medium, comprising:

moving a reading device to a position that corresponds to or is within a predetermined number of tracks of a target location on a recording medium;

checking whether or not an authorization signal is output for the position to which the reading device has been moved, the authorization signal being output when a frame synchronization signal has been detected from an output signal of the reading device consecutively a predetermined number of times; and extending a variable frequency range of a synchronization clock of a phase-locked loop (PLL) circuit when the authorization signal is not output, the synchronization clock being phase-synchronized to the output signal of the reading device, wherein the output signal is an eight-to-fourteen modulation (EFM) signal derived from an radio frequency (RF) circuit coupled to the reading device, wherein the authorization signal is not output when the synchronization clock of the PLL circuit is not synchronized to the EFM signal, wherein extending the variable frequency range of the synchronization clock is caused by increasing a gain of a phase detector in the PLL circuit, and wherein the gain of the phase detector is reset to an initial value when the authorization signal is output and a number of tracks to be moved is zero.

2. The method as set forth in claim 1, further comprising:
if in said checking the authorization signal is not output for the position to which the reading device has been moved, checking for defects on the recording medium, and then extending the variable frequency range of the synchronization clock of the PLL circuit when no defects are found on the recording medium.

3. The method as set forth in claim 1, further comprising:
if in said checking the authorization signal is not output for the position to which the reading device has been moved, checking a current servo-control state of the reading device, and then extending the variable frequency range of the synchronization clock of the PLL circuit based on the checking result of the current servo-control state.

4. The method as set forth in claim 1, wherein in said extending, the variable frequency range of the synchronization clock of the PLL circuit is extended by adjusting a gain of a phase detector included in the PLL circuit.

5. The method as set forth in claim 1, further comprising resetting the variable frequency range of the synchronization clock of the PLL circuit to an initial value if the authorization signal is output consecutively a predetermined number of times.

6. An apparatus for reading, reproducing, or recording a recording medium, comprising:
a servo-controller configured to move a reading device to a position corresponding to or within a predetermined number of tracks of a target location on a recording medium;
a signal processor configured to check whether or not an authorization signal is output for the position to which the reading device has been moved, the authorization signal being output when a frame synchronization signal has been detected from an output signal of the reading device consecutively a predetermined number of times; and
a controller configured to extend a variable frequency range of a synchronization clock of a phase-locked loop (PLL) circuit when the authorization signal is not output, the synchronization clock being phase-synchronized to the output signal of the reading device,
wherein the output signal is an eight-to-fourteen modulation (EFM) signal derived from an radio frequency (RF) circuit coupled to the reading device,
wherein the authorization signal is not output when the synchronization clock of the PLL circuit is not synchronized to the EFM signal,
wherein extending the variable frequency range of the synchronization clock is caused by increasing a gain of a phase detector in the PLL circuit, and
wherein the gain of the phase detector is reset to an initial value when the authorization signal is output and a number of tracks to be moved is zero.

7. The apparatus as set forth in claim 6, wherein if the authorization signal is not output, the controller checks for the existence of defects on the recording medium and then executes a control command to extend the variable frequency range of the synchronization clock of the PLL circuit when no defects are found on the recording medium.

8. The apparatus as set forth in claim 6, wherein if the authorization signal is not output, the controller checks a current servo-control state of the reading device and then executes a control command to extend the variable frequency range of the synchronization clock of the PLL circuit depending on the checking result of the current servo-control state.

9. The apparatus as set forth in claim 6, wherein the PLL circuit comprises:

an oscillator configured to produce a clock signal whose frequency is controlled by an input voltage;
a divider configured to frequency divide and output the oscillator clock signal;
a phase detector configured to produce a signal in proportion to a phase difference between the divided oscillator clock signal and the signal supplied from the reading device, a gain of the output signal of the phase detector being controlled by the controller; and
a filter configured to low-pass filter the output signal of the phase detector and provide the low-pass output signal to the oscillator.

10. The apparatus as set forth in claim 6, wherein the controller manages information indicating whether or not the variable frequency range of the synchronization clock has been extended.

11. The method as set forth in claim 1, wherein the clock of the PLL circuit lies in a first range before the variable frequency range is extended and lies in a second range after the variable frequency range is extended, wherein the clock is unable to be phase synchronized with the EFM signal in the first range and is able to be phase synchronized in the second range.

12. The method as set forth in claim 1, further comprising:
calculating the target location; and
checking whether or not the target location is a desired target location if the authorization signal is output and extending the variable frequency range of the synchronization clock of the PLL circuit if the authorization signal is not output.

13. The method as set forth in claim 12, further comprising:
if the target location is not a desired target location, repeating movement of the reading device to the desired target location within a predetermined seek retry limit.

14. The apparatus as set forth in claim 6, wherein the controller is to check whether or not the target location is a desired target location if the authorization signal is output and is to extend the variable frequency range of the synchronization clock of the PLL circuit if the authorization signal is not output.

15. The apparatus as set forth in claim 14, if the target location is not a desired target location, repeating movement of the reading device to the desired target location within a predetermined seek retry limit.

16. The method as set forth in claim 1, wherein the authorization signal is output only when a frame synchronization signal has been detected from the EFM signal consecutively a predetermined number of times greater than one.

17. A method of eliminating errors in a seek operation on a recording medium, comprising:
moving a reading device to a position that corresponds to or is within a predetermined number of tracks of a target location on a recording medium;
checking whether or not an authorization signal is output for the position to which the reading device has been moved, the authorization signal being output when a frame synchronization signal has been detected from an output signal of the reading device consecutively a predetermined number of times; and
extending a variable frequency range of a synchronization clock of a phase-locked loop (PLL) circuit when the authorization signal is not output, the synchronization clock being phase-synchronized to the output signal of the reading device, wherein:
the output signal is an eight-to-fourteen modulation (EFM) signal derived from an radio frequency (RF) circuit coupled to the reading device, and the authorization signal is not output when the synchronization clock of the PLL circuit is not synchronized to the EFM signal, the authorization signal is output only when a frame synchronization signal has been detected from the EFM signal consecutively a predetermined number of times greater than one, and wherein the method further comprises when the authorization signal is not output:

determining if a defect signal is output from an radio frequency (RF) circuit; and determining whether a current operating state is a tacking on state, wherein said extending is performed with the defect signal is not output and the current operating state is a tacking on state.

18. The method as set forth in claim 17, wherein the defect signal indicates that an RF signal has not been detected from the RF circuit for a preset period of time.

19. The apparatus as set forth in claim 6, wherein the extending the variable frequency range of the synchronization clock is caused by increasing a gain of a phase detector in the PLL circuit, and wherein the gain of the phase detector is reset to an initial value when the authorization signal is output and a number of tracks to be moved is zero.

20. An apparatus for reading, reproducing, or recording a recording medium, comprising:

a servo-controller configured to move a reading device to a position corresponding to or within a predetermined number of tracks of a target location on a recording medium;

a signal processor configured to check whether or not an authorization signal is output for the position to which the reading device has been moved, the authorization signal being output when a frame synchronization signal has been detected from an output signal of the reading device consecutively a predetermined number of times; and a controller configured to extend a variable frequency range of a synchronization clock of a phase-locked loop (PLL) circuit when the authorization signal is not output, the synchronization clock being phase-synchronized to the output signal of the reading device, wherein the output signal is an eight-to-fourteen modulation (EFM) signal derived from an radio frequency (RF) circuit coupled to the reading device, wherein the authorization signal is not output when the synchronization clock of the PLL circuit is not synchronized to the EFM signal, and wherein the authorization signal is output only when a frame synchronization signal has been detected from the EFM signal consecutively a predetermined number of times greater than one.

21. The apparatus as set forth in claim 20, wherein, when the authorization signal is not output, the controller or signal processor:

determines if a defect signal is output from an radio frequency (RF) circuit; and determines whether a current operating state is a tacking on state, wherein said extending is performed with the defect signal is not output and the current operating state is a tacking on state.

22. The apparatus as set forth in claim 21, wherein the defect signal indicates that an RF signal has not been detected from the RF circuit for a predetermined period of time.

* * * * *